UNITED STATES PATENT OFFICE.

CARLETON ELLIS, OF MONTCLAIR, NEW JERSEY, ASSIGNOR TO HYDROGENATED OIL COMPANY, A CORPORATION OF NEW YORK.

EDIBLE OIL PRODUCT.

14,607. Specification of Reissued Letters Patent. Reissued Mar. 11, 1919.

No Drawing. Original No. 1,037,881, dated September 10, 1912, Serial No. 700,234, filed May 28, 1912. Application for reissue filed January 17, 1916. Serial No. 72,450.

*To all whom it may concern:*

Be it known that I, CARLETON ELLIS, a citizen of th United States, and a resident of Montclai in the county of Essex and State of New Jersey, have invented certain new and useful Improvements in Edible Oil Products, of which the following is a specification.

This invention relates to a process of making an edible oil product especially a composition suited for use as a vegetable lard and relates in particular to the use of hydrogenated oils and the like, especially in conjunction with cocoanut oil or fat with or without hydrogenation treatment, and also relates to a process of making a composition comprising hydrogenated cotton seed oil or soya bean and cocoanut oil and the like and to the composition derived by such process; all as more fully hereinafter described and claimed.

By treatment of cotton seed oil with hydrogen in the presence of a catalyzer, such as finely divided nickel, a solid product is secured which is practically free from odor, and which may be blended or may be incorporated with oils or fats such as cocoanut oil, to produce a vegetable lard particularly well adapted to culinary operations. Such a product, however, is not fully satisfactory in appearance for edible purposes, and by the present invention special treatment is provided which affords a product of the proper appearance.

To illustrate the present invention, the following formula and method of treatment will be given: Ninety parts of cotton seed oil are mixed with ten parts of cocoanut oil and the mixture subjected to the action of hydrogen at a temperature of about 150° to 160° C. in the presence of finely divided nickel, whereby a substantial proportion of the unsaturated material is converted into saturated material. The iodin number of the composition is thereby reduced and a solid composition forms which may be subjected to the operation of aeration. The aeration treatment may comprise beating the hydrogenated composition with rapidly revolving paddles or blades until a sufficient quantity of air is incorporated in the product, in a finely vesiculated or well distributed condition, to produce a material of the desired light colored appearance. Ordinarily, I prefer to incorporate several per cent. by volume of air in this manner, 5 to 10% by volume being a suitable amount.

The proportion of cocoanut oil which may be incorporated is preferably about 10%, although twice this amount may be used if desired. The amount should not however, under ordinary conditions, exceed 30%, unless care be taken to completely hydrogenate all unsaturated material in the cocoanut oil. To be sure, cocoanut oil has an iodin value of only 7 to 10 which is indicative of the small proportion of unsaturated bodies present. But in spite of this, in order to secure a permanent product which does not separate or grow lumpy on standing, and which remains in a substantially neutral condition for a long period of time, even when exposed to the air, it is desirable that the iodin number of the cocoanut oil should be reduced to practically zero, if larger proportions than 30% or thereabout are incorporated with the hydrogenated cotton seed oil.

In a similar manner, cocoanut oil may be incorporated in aerated mixture with hydrogenated corn, soya bean or peanut oil, or similar vegetable oils, it being desirable to materially reduce the iodin number by hydrogenation, in the case of these oils, in the event cocoanut oil to the extent of 20% or 30% is to be incorporated. In any case, hydrogenation should preferably be carried to the point where a soft body of the consistency of ordinary lard is produced.

The advantages of such a product over ordinary lard are several. One is that owing to the high evaporation point of the more volatile components of the hydrogenated product as above set forth, ordinarily there is less smoke and fume caused when heating these oils in culinary operations. Furthermore, owing to the higher temperature which may be reached with compositions of this character, better effects are secured, especially in frying operations.

While it is possible to aerate ordinary fat, by treating in the manner described, it is difficult to produce a product which will keep for a long period when intimately incorporated with air in this manner, but by hydrogenating cotton seed or corn oil or similar oils to materially reduce the iodin number the more sensitive double bonds are saturated with hydrogen and thereby eliminated and oxidation tendency is reduced.

To recapitulate, the invention involves hydrogenating an oil for example, of a vegetable nature, such as cotton seed, corn or peanut oil, to produce a hydrogenated product and in mixing such normally liquid oils, stiffened or hardened by hydrogenation, with a quantity of an oil or a normally hard fat or grease, such as cocoanut oil, which, preferably, has also been hydrogenated and in preferably chilling and heating the composition to introduce a quantity of air to aerate same and render suitable light color.

In some of the appended claims I include the expression "hydrogenated normally liquid oil" and other similar expressions. In such claims, "normally liquid" means that the oil in its original condition, *i. e.*, before hydrogenation, is a liquid. "Normally non-liquid" is used in an analogous manner.

What I claim is:—

1. The process of making an edible oil which comprises hydrogenating cotton seed oil, adding another oil and aerating to introduce a volume of air equal to at least 5 per cent. of the volume of the oil composition.

2. An edible oil composition comprising hydrogenated cotton seed oil and another oil containing vesiculated air.

3. An edible oil composition comprising edible hydrogenated vegetable oil containing vesiculated air.

4. An edible oil composition comprising hydrogenated cotton seed oil containing vesiculated air.

5. An edible oil product comprising a major proportion of hydrogenated cotton seed oil and a minor proportion of cocoanut oil, said composition containing incorporated air.

6. An edible oil composition comprising about 90% of hydrogenated cotton seed oil and about 10% of cocoanut oil; said composition containing incorporated air.

7. An edible oil product comprising hydrogenated cotton seed oil and hydrogenated cocoanut oil.

8. An edible oil product comprising edible hydrogenated cottonseed oil and edible cocoanut oil.

9. An edible oil product of lard-like consistency comprising incorporated edible hydrogenated oil and edible oily material, all in a state of aeration.

10. An edible fatty product of substantially lard-like consistency, comprising aerated edible hydrogenated normally liquid oil material and edible normally non-liquid fatty material incorporated therewith.

11. An edible fatty product comprising aerated edible hydrogenated normally liquid oil material and edible hydrogenated normally non-liquid fatty material incorporated therewith.

12. An edible oil product comprising edible hydrogenated normally liquid oil and edible hydrogenated normally non-liquid oily material incorporated therewith.

13. An edible fatty product comprising edible hydrogenated normally liquid oil material and edible hydrogenated normally solid fatty material incorporated therewith.

14. The process of making an edible oil which comprises hydrogenating cotton seed oil and cocoanut oil, and in aerating same.

15. An edible fatty product of about the consistency of ordinary edible fats which comprises edible hydrogenated vegetable oil whitened by an incorporated gas.

16. An edible fatty product of about the consistency of ordinary edible fats which consists of a mixture of edible hydrogenated vegetable oil whitened by an incorporated gas inclosed and embedded in a vesiculated form in substantially permanent manner throughout the mass of said edible fat.

17. In an edible fat product of about the consistency of ordinary cooking fats the combination of an edible hydrogenated oil and cocoanut oil.

18. A fat product containing cocoanut oil and hydrogenated normally liquid vegetable oil, such product being of a consistency substantially like that of ordinary soft-solid cooking fats.

19. A fat product containing hydrogenated cocoanut oil and another hydrogenated vegetable oil, such product being of a consistency substantially like that of ordinary soft-solid edible fats.

CARLETON ELLIS.